(12) United States Patent
Shaffer et al.

(10) Patent No.: US 9,723,538 B2
(45) Date of Patent: Aug. 1, 2017

(54) SYSTEMATIC NEIGHBOR DETECTION IN SHARED MEDIA COMPUTER NETWORKS

(75) Inventors: Shmuel Shaffer, Palo Alto, CA (US); Sandeep J. Shetty, San Jose, CA (US); Richard G. Geiger, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 952 days.

(21) Appl. No.: 13/164,734

(22) Filed: Jun. 20, 2011

(65) Prior Publication Data
US 2012/0320790 A1 Dec. 20, 2012

(51) Int. Cl.
| | |
|---|---|
| *G01R 31/08* | (2006.01) |
| *H04W 40/24* | (2009.01) |
| *H04W 40/28* | (2009.01) |
| *H04W 84/18* | (2009.01) |
| *H04L 12/753* | (2013.01) |

(52) U.S. Cl.
CPC ......... *H04W 40/246* (2013.01); *H04W 40/28* (2013.01); *H04L 45/48* (2013.01); *H04W 84/18* (2013.01)

(58) Field of Classification Search
CPC .......... H04L 29/06027; H04W 40/246; H04W 40/28; H04W 84/18
See application file for complete search history.

(56) References Cited

U.S. PATENT DOCUMENTS

| | | | |
|---|---|---|---|
| 6,487,186 B1 * | 11/2002 | Young | H04W 72/0446 370/329 |
| 7,444,145 B2 | 10/2008 | Diener | |
| 7,457,883 B2 | 11/2008 | Penk et al. | |
| 7,826,463 B2 | 11/2010 | Patel et al. | |
| 7,870,600 B2 | 1/2011 | Huotari et al. | |
| 7,899,027 B2 | 3/2011 | Castagnoli et al. | |
| 7,903,585 B2 | 3/2011 | Feng et al. | |
| 7,908,643 B2 | 3/2011 | Huotari et al. | |
| 7,925,729 B2 | 4/2011 | Bush et al. | |
| 7,930,386 B2 | 4/2011 | Davis et al. | |
| 8,599,719 B1 * | 12/2013 | Doherty | H04W 8/005 370/254 |
| 2002/0089994 A1 * | 7/2002 | Leach, Jr. | H04L 1/08 370/412 |

(Continued)

*Primary Examiner* — Gregory Sefcheck
*Assistant Examiner* — Jael Ulysse
(74) *Attorney, Agent, or Firm* — Parker Ibrahim & Berg LLC; James M. Behmke; Stephen D. LeBarron

(57) ABSTRACT

In one embodiment, a particular node in a shared media computer network may determine a set of network parameters for the network, and a timing of super-frames in the network, each super-frame having one or more frames, each frame divided into a plurality of timeslots. In addition, the particular node computes a discovery scheduling function using its own identification to determine in which particular timeslot of the frames to transmit a network discovery packet. Accordingly, the particular node may transmit the network discovery packet in the particular timeslot of the frames. In an additional or alternative embodiment, the particular node may receive a network discovery request from a requesting node. In response, the particular node determines whether it is free to reply to the network discovery request based on parameters in the network discovery request, and if free to reply, may transmit a network discovery packet to the requesting node.

21 Claims, 12 Drawing Sheets

(56) References Cited

U.S. PATENT DOCUMENTS

| Publication No. | Date | Name | Classification | Subclass |
|---|---|---|---|---|
| 2003/0007461 A1* | 1/2003 | Chen | H04L 29/12254 | 370/254 |
| 2005/0195827 A1* | 9/2005 | Yao | H04J 3/0676 | 370/395.4 |
| 2006/0146834 A1* | 7/2006 | Baker | H04W 36/0088 | 370/395.53 |
| 2006/0148516 A1* | 7/2006 | Reddy | H04W 4/02 | 455/552.1 |
| 2006/0215581 A1* | 9/2006 | Castagnoli | H04L 12/2602 | 370/254 |
| 2006/0215582 A1* | 9/2006 | Castagnoli | H04L 45/02 | 370/254 |
| 2006/0215583 A1* | 9/2006 | Castagnoli | H04L 45/02 | 370/254 |
| 2006/0268792 A1* | 11/2006 | Belcea | H04L 12/5693 | 370/338 |
| 2007/0286136 A1* | 12/2007 | Rittle | H04W 8/005 | 370/338 |
| 2008/0170550 A1* | 7/2008 | Liu | H04W 40/26 | 370/338 |
| 2008/0279155 A1* | 11/2008 | Pratt, Jr. | H04L 12/66 | 370/336 |
| 2009/0052347 A1* | 2/2009 | Kim | H04L 29/1232 | 370/254 |
| 2009/0154481 A1* | 6/2009 | Han | H04L 12/66 | 370/406 |
| 2009/0225730 A1* | 9/2009 | Kesselman | H04W 48/12 | 370/338 |
| 2009/0303902 A1* | 12/2009 | Liu | H04L 12/189 | 370/254 |
| 2010/0110930 A1* | 5/2010 | Kohvakka | H04W 56/0025 | 370/254 |
| 2011/0103264 A1* | 5/2011 | Wentink | H04W 8/005 | 370/255 |
| 2011/0205962 A1* | 8/2011 | Das | H04W 74/00 | 370/328 |

\* cited by examiner

SYSTEMATIC NEIGHBOR DETECTION IN SHARED MEDIA COMPUTER NETWORKS

TECHNICAL FIELD

The present disclosure relates generally to computer networks, and, more particularly, to neighbor detection in shared media computer networks.

BACKGROUND

Wireless mesh networks have become increasingly popular and practical in recent years. For instance, mesh networks have been employed in Municipal Wi-Fi and increasingly in low data rate wireless sensor networks. The mesh topology can allow the wireless coverage of the network to be extended economically and effectively in fairly challenging topographical environments. For example, advanced metering infrastructure (AMI) services, such as remote utility meter reading, power outage notification, etc., that are performed in a neighborhood area network (NAN) (e.g., within a "Smart Grid") are an important area where a multi-hop wireless mesh sensor network has been employed. In order to minimize the cost to build and operate the network, utilities often employ unlicensed spectrum (e.g., 900 MHz) and low cost radios in this network. Furthermore, utilities have tried to associate large number of smart meters with a single collector/relay in order to minimize infrastructure costs (e.g. reduce the number of collectors). A target number of 5000 nodes associated with a single collector is not atypical.

Management of a mesh at these scales creates many challenges in the NAN. First, the nodes are not optimally placed and maybe densely packed. Moreover, there is a relatively small amount of bandwidth (e.g., 26 MHz in the 915 MHz band) available for a very large number of nodes. Hence, a poorly managed/structured NAN network will inevitably lead to congestion problems due to contention and collisions.

In particular, an area that is severely impacted is the formation of the mesh network. More specifically, the neighbor relationships among nodes may take a long time to form. The neighbor relationship is important for setting up the routing of the packets as well as the radio resource management of the mesh cell (e.g., dynamic power and channel assignment).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
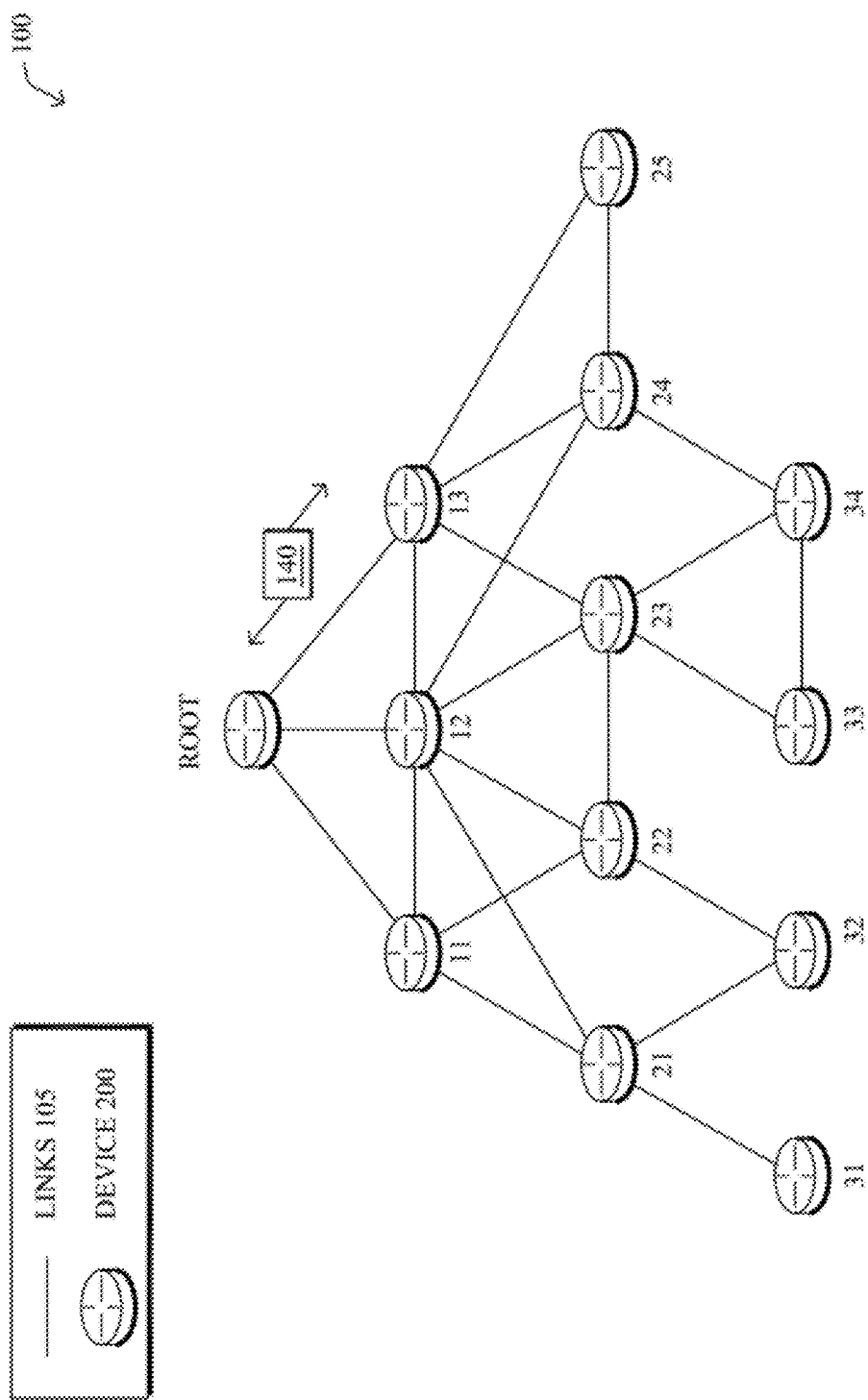
FIG. 1 illustrates an example computer network.

According to one or more embodiments of the disclosure, e.g., in a passive discovery mode, a particular node in a shared media computer network may determine a set of network parameters for the network, and a timing of super-frames in the network, each super-frame having one or more frames, each frame divided into a plurality of timeslots. In addition, the particular node computes a discovery scheduling function using its own identification to determine in which particular timeslot of the frames to transmit a network discovery packet. Accordingly, the particular node may transmit the network discovery packet in the particular timeslot of the frames, the network discovery packet carrying the network parameters and the identification of the particular node.

According to one or more additional embodiments of the disclosure, e.g., in an active discovery mode, a particular node in a shared media computer network may receive a network discovery request from a requesting node. In response, the particular node may determine whether it is free to (it should) reply to the network discovery request based on one or more parameters in the network discovery request, and if free to reply, may transmit a network discovery packet to the requesting node.

According to one or more still further embodiments of the disclosure, it may first be determined whether a shared media computer network is operating in the passive discovery mode or the active discovery mode, and the particular node may operate according to the appropriate mode.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "Root", "11", "12", . . . "34", and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to any type of suitable networks, such as those that have branches emitting to all directions with the root node generally centralized among a plurality of surrounding nodes.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared media protocols where appropriate. In this context, a protocol consists of a set of rules defining how the nodes interact with each other.

Figure 2:
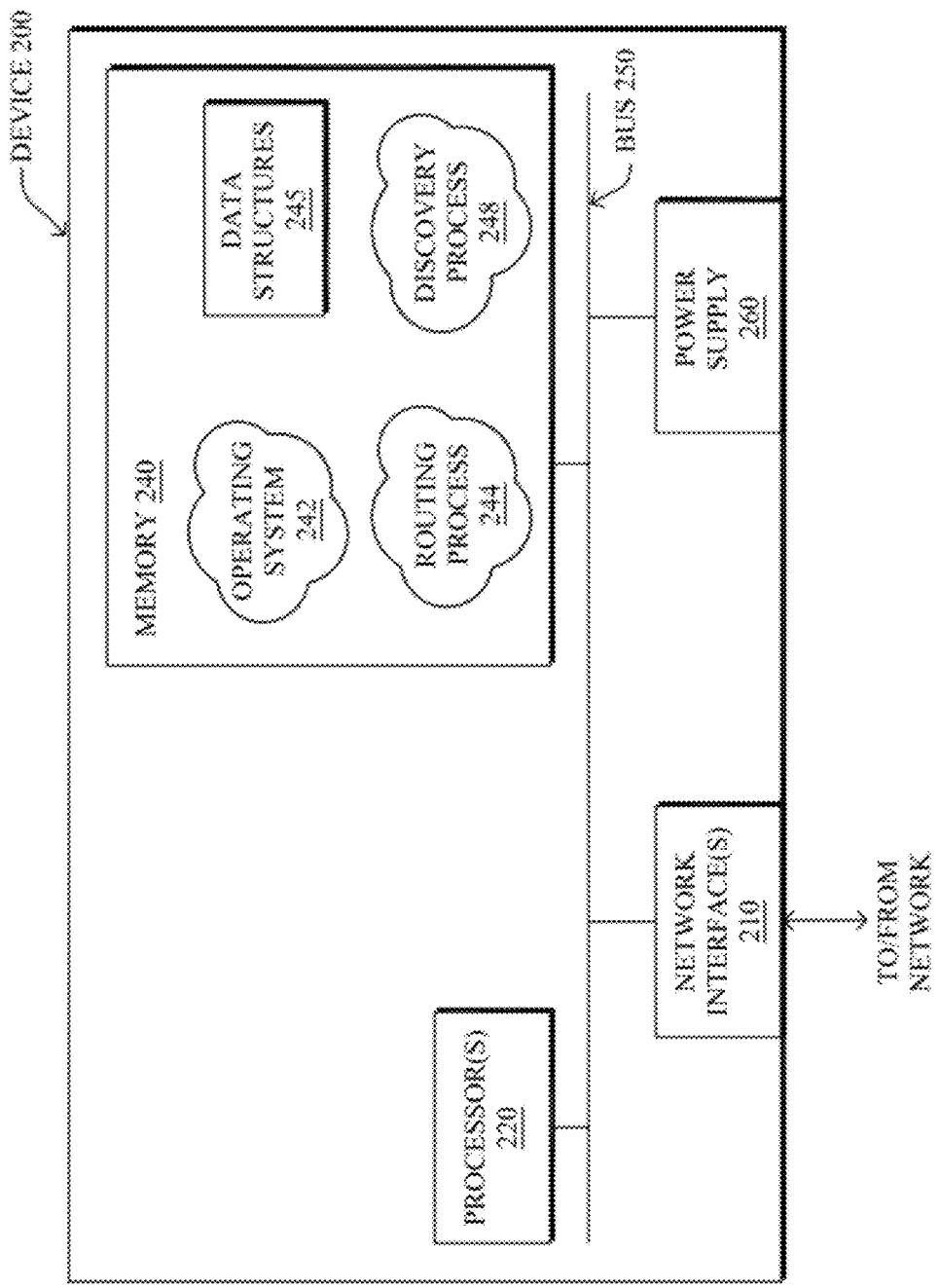
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "discovery" process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built based on an Objective Function (OF). The role of the Objective Function is generally to specify rules on how to build the DAG (e.g. number of parents, backup parents, etc.).

As noted above, wireless mesh networks have become increasingly popular and practical in recent years. In particular, wireless mesh networks, or other shared media computer networks, such as PLC, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

As further noted above, in order to minimize the cost to build and operate the network, utilities often employ unlicensed spectrum (e.g., 900 MHz) and low cost radios in this network. Furthermore, utilities have tried to associate large number of smart meters with a single collector/relay in order to minimize infrastructure costs (e.g. reduce the number of collectors). A target number of 5000 nodes associated with a single collector is not atypical. Management of a mesh (e.g., NAN) at these scales creates many challenges in a mesh network such as a NAN. First, the nodes are not optimally placed and maybe densely packed. Moreover, there is a relatively small amount of bandwidth (e.g., 26 MHz in the 915 MHz band) available for a very large number of nodes. Hence, a poorly managed/structured NAN network will inevitably lead to congestion problems due to contention and collisions.

In particular, an area that is severely impacted is the formation of the mesh network. More specifically, the neighbor relationships among nodes may take a long time to fatal. The neighbor relationship is important for setting up the routing of the packets as well as the radio resource management of the mesh cell (e.g., dynamic power and channel assignment). However, when network discovery packets collide in dense networks, they cannot be deciphered, and it is difficult for a node seeking to join a network (or discover its neighbors) to obtain an appropriate beacon signal. That is, certain current systems utilize beacons on each channel used in the network to indicate a node's the presence of the network. The major drawback with this approach is that if there are many channels in the network, the scanning for neighboring networks may be time consuming. In order to alleviate discovering nodes on multiple channels, other systems have proposed having a separate channel dedicated to each nodes in a mesh to send a neighbor discovery message. However, this approach in a 5000 node network would take some time (5000*timeslot_interval minimum).

In order to speed up the discovery of the network, in other systems nodes that are trying to discover a network will perform an active scan where they transmit broadcast probe frames. Nodes in the network that are able to properly receive these probe frames will respond to the node to identify their presence. Active scanning still requires searching through many channels, but can shorten the dwell time on each channel. Note, however, that probing can greatly increase chatter in the network if many clients are probing and there is a high density of nodes in the neighborhood, thus leading to greater congestion and resultant collisions.

Network/Neighbor Discovery

The techniques herein accelerate the initial convergence of a node (formation of the neighbor relationships) by imposing structure into the transmission of a neighbor discovery packets sent by the nodes. More specifically this invention aims to reduce the maximum time it takes a mesh network to converge. Both a passive and active discovery mechanisms are detailed. Once the network achieves its initial convergence, it can move to another stage where the network both optimizes the mesh graph as well as uses the converged mesh to start transmission of data.

The effectiveness of the passive scanning of nodes in the network is enhanced by a deterministic yet flexible scheduling scheme based on the pre-existing node identification (e.g., MAC addresses) which controls the level of contention among competing nodes, as well as, provides a known time reference to expect a discovery packet from a given node once identified. Similarly, in order to improve the effectiveness of the active scan of nodes, the techniques herein deterministically limit replies to probes/requests in order to reduce the contention/collisions encountered in a dense wireless mesh network. These techniques are particularly important in large scale wireless mesh networks where the nodes are randomly located, the node density can vary, the bandwidth maybe limited, and/or the network has many channels.

Specifically, according to one or more embodiments of the disclosure as described in detail below, e.g., in a passive discovery mode, a particular node in a shared media computer network may determine a set of network parameters for the network, and a timing of super-frames in the network, each super-frame having one or more frames, each frame divided into a plurality of timeslots. In addition, the particular node computes a discovery scheduling function using its own identification to determine in which particular timeslot of the frames to transmit a network discovery packet. Accordingly, the particular node may transmit the network discovery packet in the particular timeslot of the frames, the network discovery packet carrying the network parameters and the identification of the particular node.

According to one or more additional embodiments of the disclosure, as described in detail further below, e.g., in an active discovery mode, a particular node in a shared media computer network may receive a network discovery request from a requesting node. In response, the particular node may determine whether it is free to reply to the network discovery request based on one or more parameters in the network discovery request, and if free to reply, may transmit a network discovery packet to the requesting node. Note that as used herein, the phrase "free to reply" may generally imply "should reply," however there may be other factors that determine whether a device should actually reply.

Illustratively, the techniques described herein may be performed by hardware, software, and/or firmware, such as in accordance with discovery process 248, which may contain computer executable instructions executed by the processor 220 to perform functions relating to the novel techniques described herein, e.g., in conjunction with routing process 244. For example, the techniques herein may be treated as extensions to conventional protocols, such as the various wireless communication protocols or PLC protocols, and as such, would be processed by similar components understood in the art that execute those protocols, accordingly.

Operationally, the techniques herein may utilize passive or active mechanisms, or both, to accelerate neighbor discovery. First, for passive scanning mode, where a device interested in discovering (learning) its network/neighbors listens passively for unsolicited network (or neighbor) discovery messages (e.g., packets 140), the following steps detail an illustrative embodiment of the disclosure.

First, a set of broadcast discovery channel(s) B={B1, B2, . . . BK}, may be defined where network discovery packets can be broadcast. The number of broadcast channels, K, may be determined by a radio resource management entity (e.g., the root node or a head-end application beyond the root node) or set during the manufacturing process or statically set by system administrator. The choice of K can be adaptively based on the channel conditions and density/capacity of the network. In some cases, there may be only one broadcast channel. The assignment of the channels is generally known in the art, and example possibilities include using a prior knowledge in the system of channel(s) used for broadcast discovery, adaptively determining these channels(s), and using a known hopping sequence or set of hopping sequences.

Figure 3:
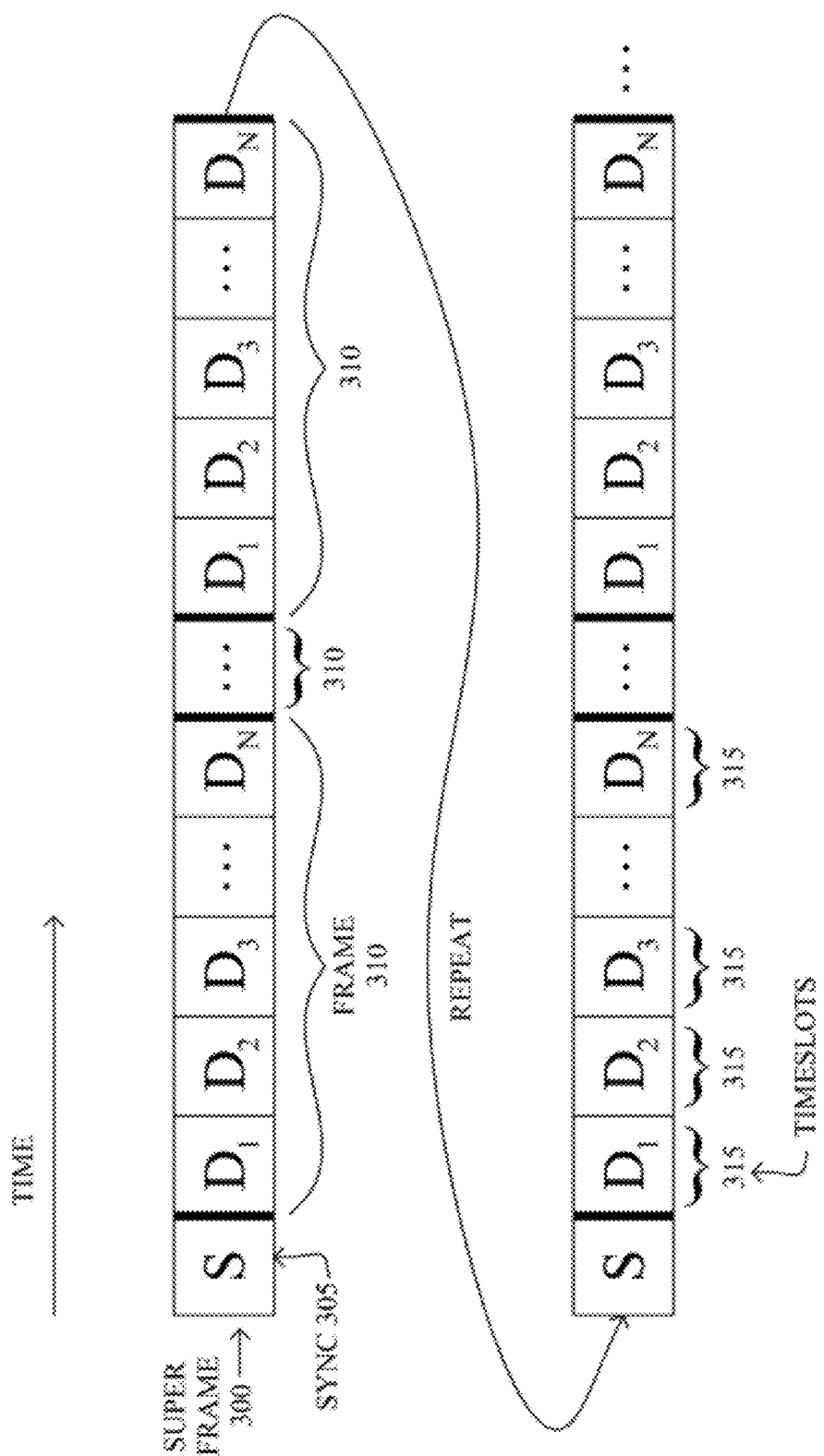
FIG. 3 illustrates an example super-frame format.

Second, a particular broadcast discovery channel is organized into a super-frame structure (i.e., each particular channel on which a network discovery packet is to be transmitted may have a specific super-frame for that particular channel). FIG. 3 illustrates an example super-frame 300 in accordance with one or more embodiments herein. For instance, each super-frame 300 may consist of M frames 310 and one or more timing synchronization slots 305. Each frame 310 is also divided into N timeslots 315 with period T. Note that the number N will likely be less than the number of nodes in the system. The radio resource management entity, the manufacturing process, or system administrator may configure this number. Moreover, it is possible not all timeslots N on the physical channel will be used for broadcasting neighbor discovery packets.

Note that the start of the super-frame 300 may be marked by the timing synchronization timeslot, S, that is used by the root node (e.g., collector) to send network parameters and a set of counters used to signal an update of the network parameters. These network parameters may be used by other nodes in the network to determine the timing of the super-frame, and are copied in the network discovery packets sent by nodes in the mesh. For example, a particular node, e.g., node 11, may receive a network discovery packet (e.g., packet 140) from the root node in a DAG. The particular node may then synchronize the super-frame timing based on the received network discovery packet (e.g., the parameters therein) from the root node, where in one example embodiment the particular timeslot is specific to the root node. Note also that while it is shown that there is only a single synchronization timeslot in the super-frame 300, multiple instances of the root node's synchronization frame may be dispersed within the super-frame, and need not be the first timeslot in the super-frame as shown. In the event there is a plurality of broadcast discovery channels B, they each may synchronize in time with the timing synchronization burst in a particular channel (e.g., B1).

Figure 4:
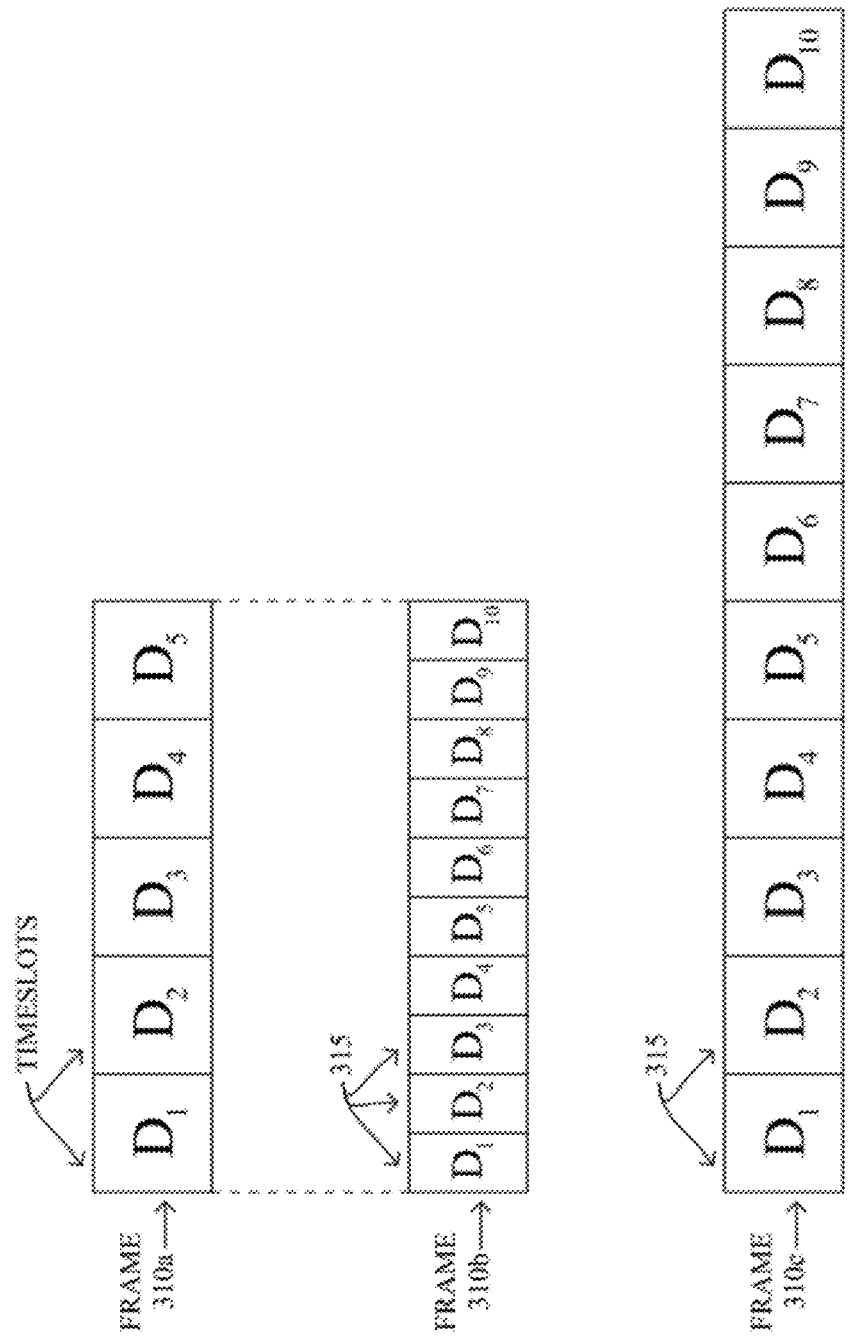
FIG. 4 illustrates an example of timeslots in a frame.

In accordance with one or more embodiments, the number of the plurality of timeslots N can adapt over time (be adjusted) based on a number of nodes in the network (e.g., members associated to the mesh). For instance, as more nodes are vying for airtime, more timeslots may need to be created to systematically separate transmissions of network discovery packets and to thus avoid congestion and/or collisions in the network. Where there are only a few nodes, on the other hand, correspondingly fewer timeslots may be needed. FIG. 4 illustrates three example frames 310*a-c* with different numbers of timeslots N, e.g., five, ten, and ten, respectively. Note that the additional timeslots may be contained within the same length frame (310*b*), or may maintain the length of each timeslot to extend the length of the frame (310*c*). Control of the timeslots may be based on an indication within the network parameters within the discovery packets, or else based on a local decision using some generally shared knowledge (e.g., routing protocols aware of topologies, etc.). Note that if the network discovery packets are being transmitted on a particular channel (and as such, has a particular corresponding super-frame), then the number of the plurality of timeslots may be adjusted based on the number of nodes in the network operating on the particular channel.

Upon determining a set of network parameters, and also a timing of the super-frame(s) in the network 100, a particular node interested in advertising itself into the network may compute a discovery scheduling function to determine when it is free to send the network discovery packets. In particular, by using an identification of the particular node (e.g., a MAC address), the particular node can determine in which particular timeslot 315 of the frames 310 to transmit a network discovery packet. For example, a node j that is already part of the network will transmit a network discovery packet if the current neighbor discovery timeslot i for frame k equals the output of its neighbor discovery scheduling function, Hk, which uses the address of the particular node as the input. (Note that since the scheduling can be based on pre-existing addressing (e.g., MAC addresses), no extra overhead is required for distribution of the addressing.) Note that because the nodes in the network share the same scheduling function, they have a deterministic way of knowing when to expect a network discovery packet. Generally, Hk should be constructed such that the output is roughly uniform for the given address space of the system. Also, the output of Hk should be a modulus of N.

Figure 5:
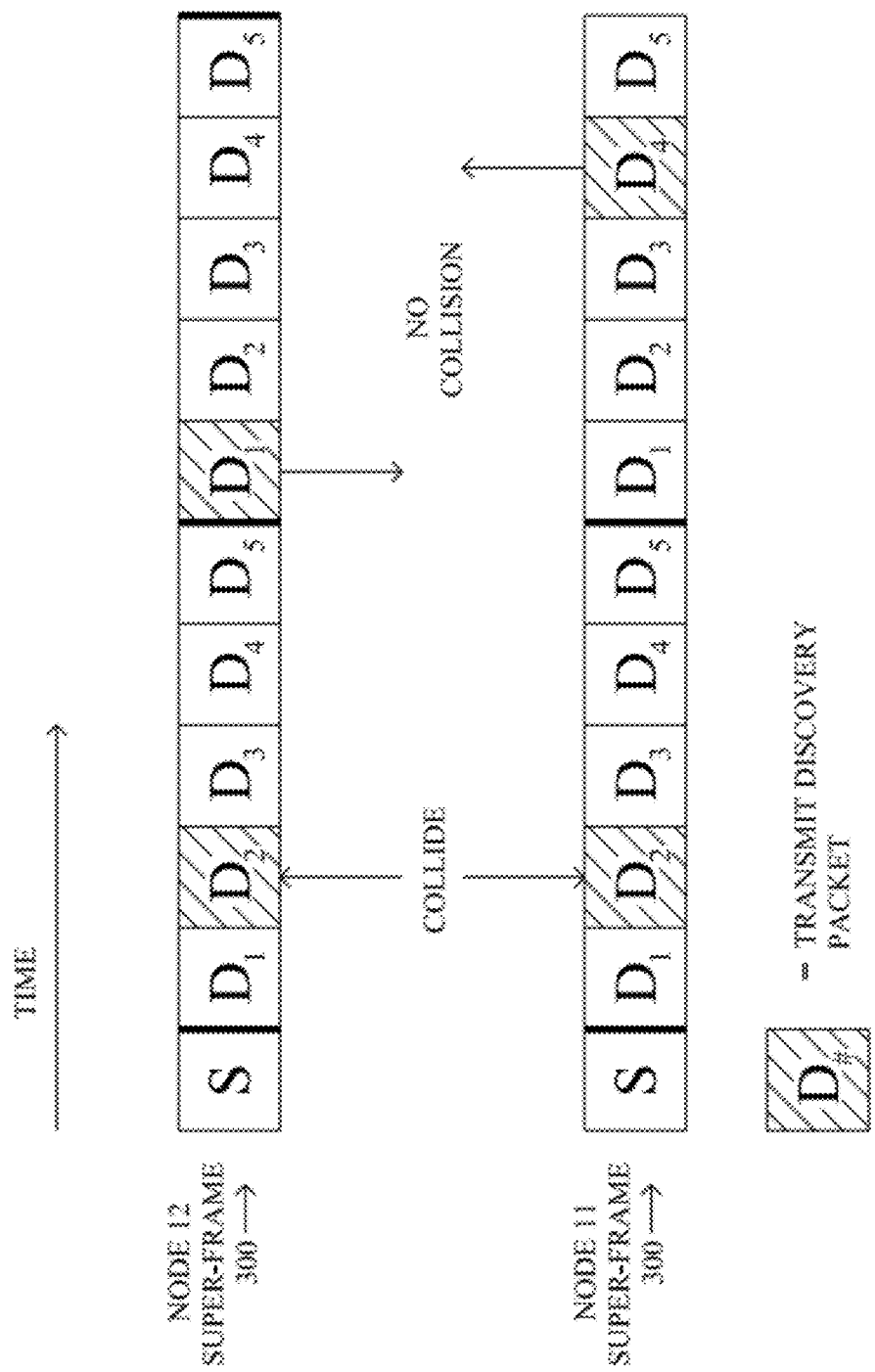
FIG. 5 illustrates an example comparison of discovery packet transmission in super-frames.

In one illustrative embodiment, Hk may specifically be a function of a particular frame k in the super-frame. That is, the discovery scheduling function may be computed to individually determine a frame-specific timeslot for each of the frames. This can be realized by having a different discovery scheduler for each frame of the super-frame. Because the scheduling function can thus be different per frame, collision between sets of neighbors is minimized in the super-frame, since the neighbors that may collide in one frame would generally not select the same timeslot in another frame based on Hk. FIG. 5 illustrates an example of when two different nodes would be scheduled in a first frame at the same timeslot, but then in a later frame during different timeslots.

Illustratively, then, nodes may transmit network discovery packets in the particular timeslot of the frames as determined by Hk, where the network discovery packet carries the network parameters and the identification of the particular node. More specifically, inside the discovery packet, the following information may exist if applicable to the network:

a. The serving channel(s) or hopping sequence of the transmitting node;

b. The timing offset from the start of the broadcast channels timeslot to the framing structure of the transmitting node; and c. If a set of neighbor discovery packets are sent in addition to the system neighbor discovery broadcast channel, information containing this separate schedule should be sent.

Figure 6A:
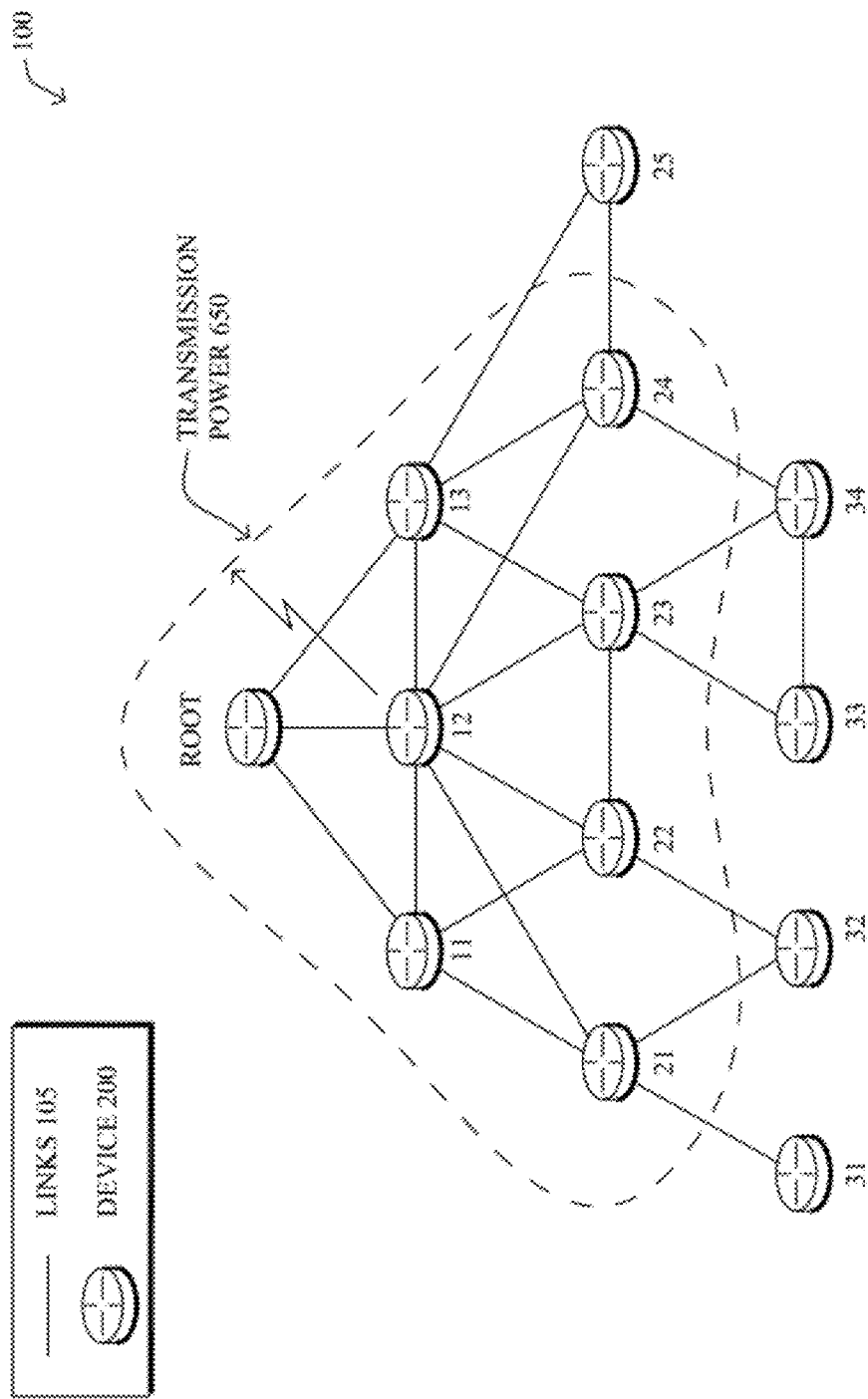
FIGS. 6A-6B illustrate example transmission powers.
Figure 6B:
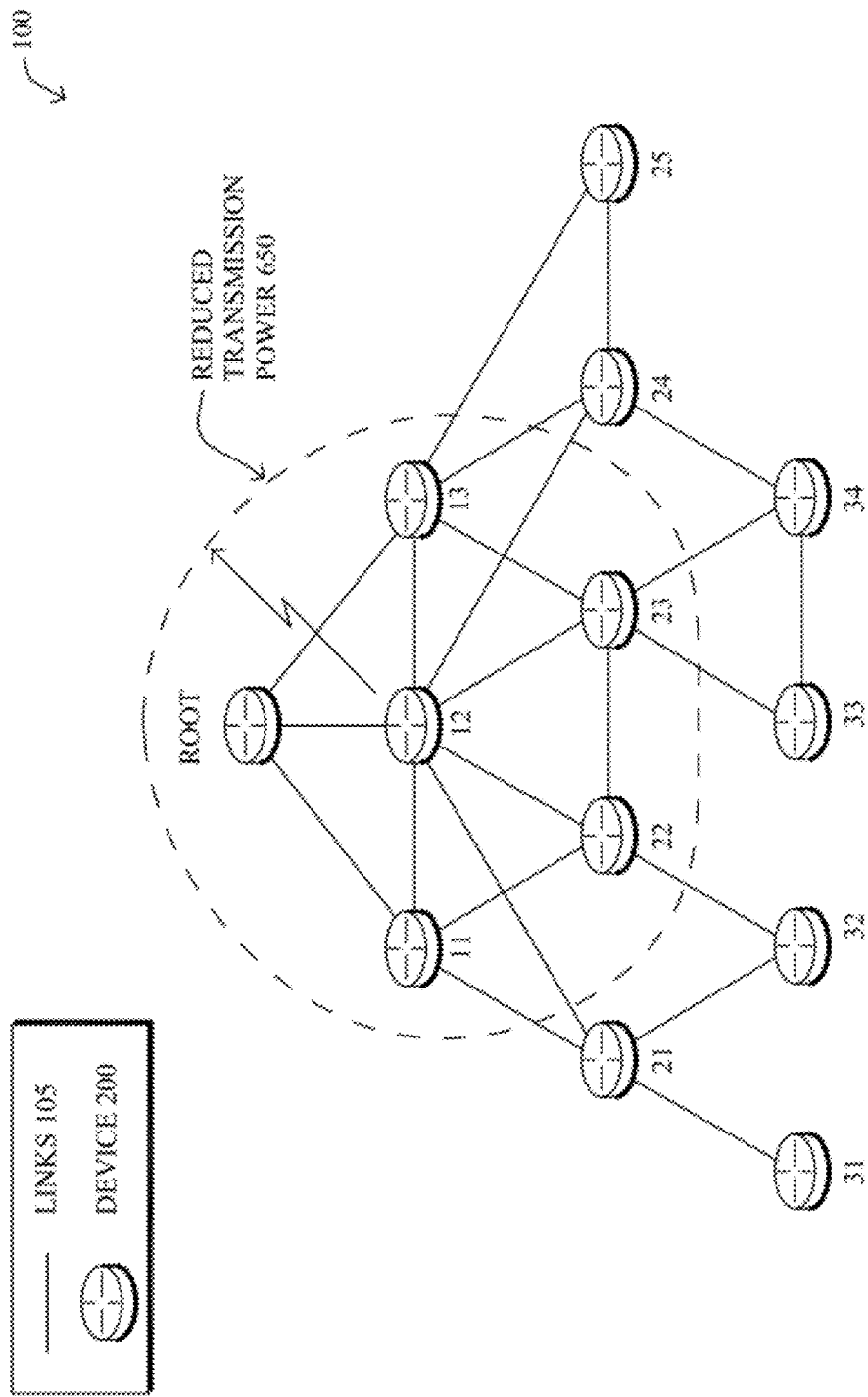

In accordance with one or more optional aspects of the embodiments herein, a power, Pi, may be defined for transmitting the neighbor discovery packets. This transmission power may be included as one of the fields in the neighbor discovery packet (e.g., as a network parameter or other indication in a received network discovery packet). Generally, Pi may be adaptively modified based on the density of the deployment, e.g., inversely (less transmission in more dense networks, and vice versa). Note that Pi can be either uniform for all nodes in the system or assigned on a per node and/or per timeslot basis. FIGS. 6A and 6B illustrate the difference between a higher transmission power 650 (FIG. 6A), and a lower transmission power 650 (FIG. 6B), where clearly the number of nodes reached by node 12's transmission is reduced by the lower power transmission.

As a further extension to one or more embodiments herein, channel access back-off parameters may be used to dictate the sending of neighbor discovery requests or association/registration request frames from nodes receiving the network discovery packets. In particular, an adaptively adjusted back-off mechanism is defined that is based on the received power level of network discovery packets to reduce the contention/collisions among competing nodes that associate or elicit further information from the discovered node. In other words, the transmitted network discovery packet may include a channel access back-off parameter based on a received power of the transmitted network discovery packet at one or more receiving nodes, wherein the channel access back-off parameter is configured to bias channel access toward receiving nodes with higher received power than a received power of other receiving nodes. That is, more powerful neighbors should be biased to access to the channel first, where an unassociated node will determine a power category it belongs to based on the received signal strength of the neighbor discovery packet. Based on that category, it will use the channel access parameters when transmitting a packet.

Still further, it may be possible to identify "less useful" frames within the super-frame, wherein the system identifies multiple collisions over time (e.g., the system identifies that collisions keep occurring during frame #13). As a result, a resource manager (root node or other head-end application) may either instructs the nodes not to transmit during a specific window (e.g., during frame #13), or alternatively commands the nodes to start using a different frequency hopping sequence or different hash algorithm Hk.

In order to speed up the discovery of the network, nodes trying to discover a network may perform active scan where they transmit broadcast probe frames (network discovery requests). Nodes in the network that are able to properly receive these probe frames would generally respond to the node to identify their presence. Also, s conventional active scanning still requires searching through many channels, though it can shorten the dwell time on each channel. But, at the same time, this probing can greatly increase the chatter in the network if many nodes are probing and there is a high density of nodes in the neighborhood.

In accordance with the active scan mode of or more additional or alternative embodiments herein, therefore, when a requesting node sends an active scan probe, i.e., the network discovery request, one or more parameters may be included that specifically limit the responses to the request in order to reduce the contention of returned replies.

In particular, when a particular node receives a network discovery request from a requesting node, the particular node can determine whether it is free to (should) reply to the network discovery request based on the parameter(s) in the network discovery request. Only in response to being free to reply to the network discovery request should the particular node then transmit a network discovery packet to the requesting node.

Figure 7:
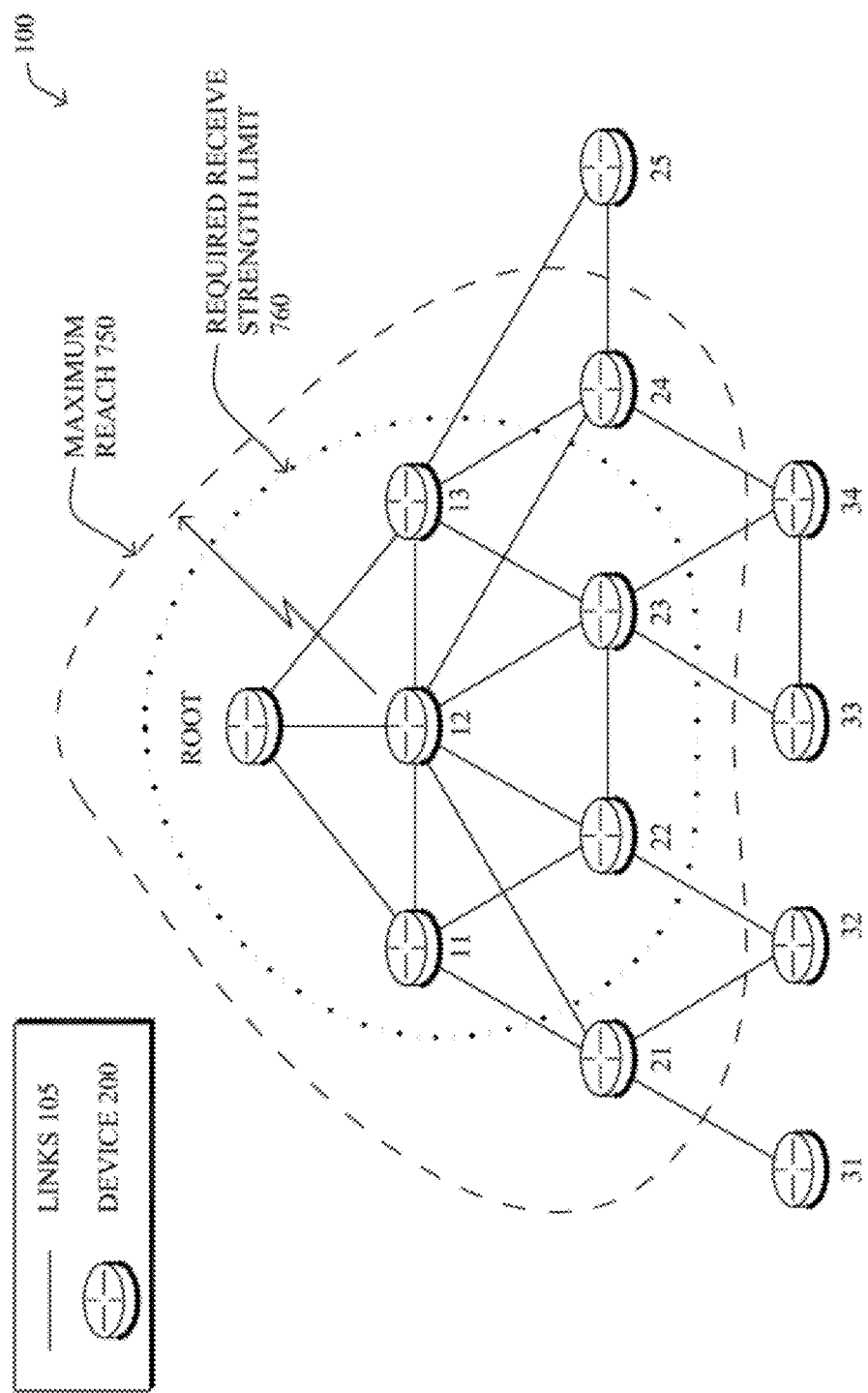
FIG. 7 illustrates an example of limiting replies to discovery requests.

In order to reduce the collisions created by the response to a neighbor discovery requests, the following illustrative limiting parameters have been defined, which may be used individually or in any suitable combination:

1) A received power range field, where nodes would not transmit a network/neighbor discovery packet if the received signal strength of a discovery request packet was not in the received power range field specified in the discovery request packet. For instance, as shown in FIG. 7, assuming node 12 has sent out the network discovery request, and that it reaches a transmission distance 750 as shown, by including parameters that limit freedom to reply to only those nodes receiving the network discovery request at a receive signal strength greater than a configured threshold, e.g., 760, the number of nodes that would reply (if so configured) is reduced, accordingly.

Figure 8:
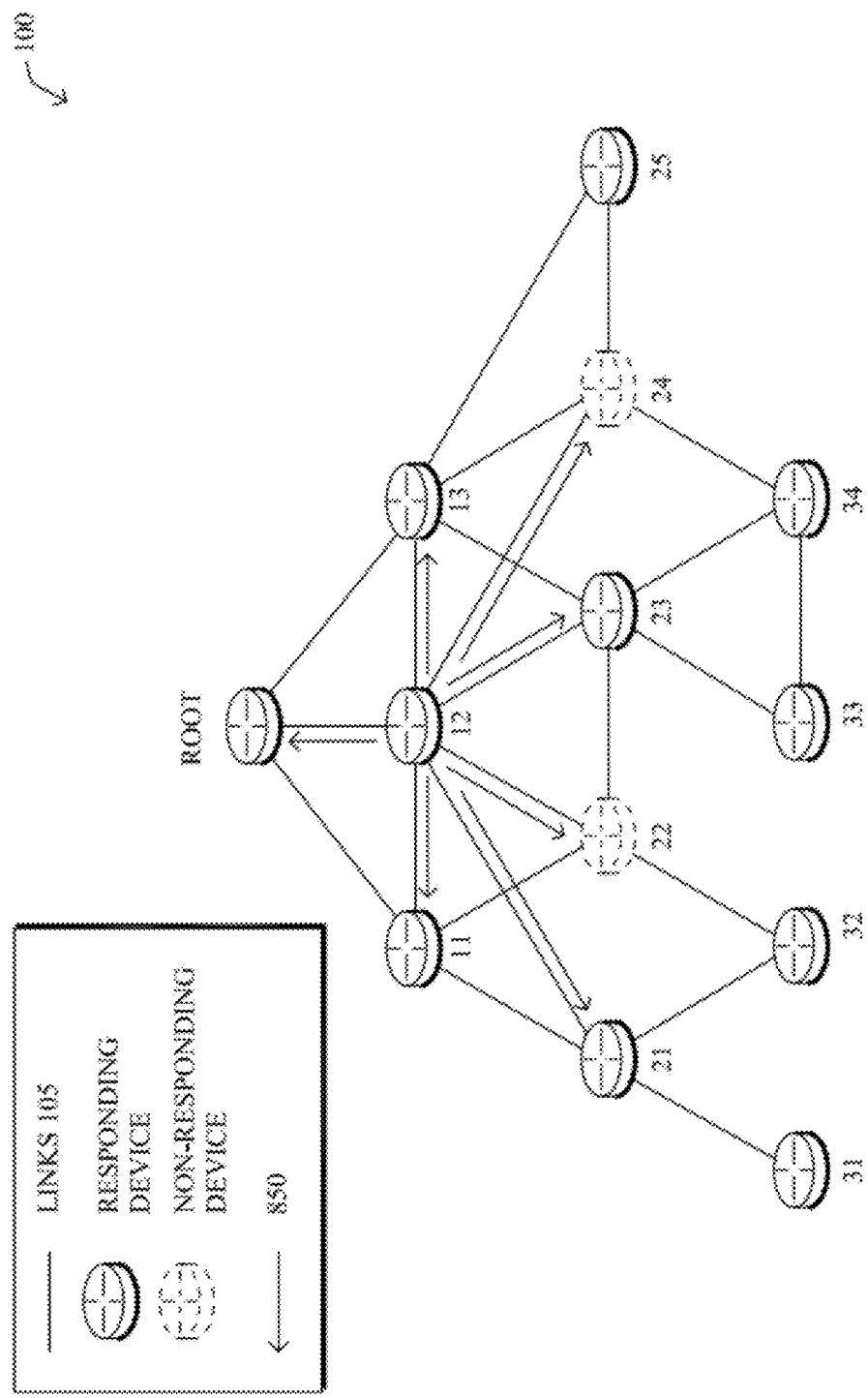
FIG. 8 illustrates another example of limiting replies to discovery requests.

2) An address mask field, which limits freedom to reply to those certain nodes having an identification (e.g., MAC address) that when input into a particular hash function results in deterministic differentiation from other nodes in the network. Said differently, a receiving node may logically AND this mask field with a hashed version of its own identification/address. For example, FIG. 8 illustrates an example where only certain nodes receiving the request 850 would match this test. For instance, in one example, only those nodes with odd (or even) identifications, e.g., addresses ending in 1 (or 0) would reply. In FIG. 8, if a node's identification is even, and should not reply, the nodes are shown in phantom, while responding nodes are shown in solid lines.

3) A channel number field, wherein a receiving node compares its operating channel with the channel in the discovery request packet. If the channel numbers do not match, then the node would not respond to the neighbor discovery request.

Notably, the requesting (scanning) node may chose to manipulate these fields/parameters based on the density and/or congestion of the network. For instance, if the requesting node transmits a request, and receives power that cannot be deciphered, it may assume that other nodes are attempting to reply with network/neighbor discovery packets, but that they are colliding at the requesting node. Accordingly, the requesting node may incrementally adjust these parameters (one or more at a time) until it can decipher the responses. In this manner, also, binary searches of the network using these fields are possible. Note also that in a specific embodiment, the nodes receiving the request may randomly back-off before sending their discovery packets (e.g., randomly or again based on received power levels as described above).

Figure 9:
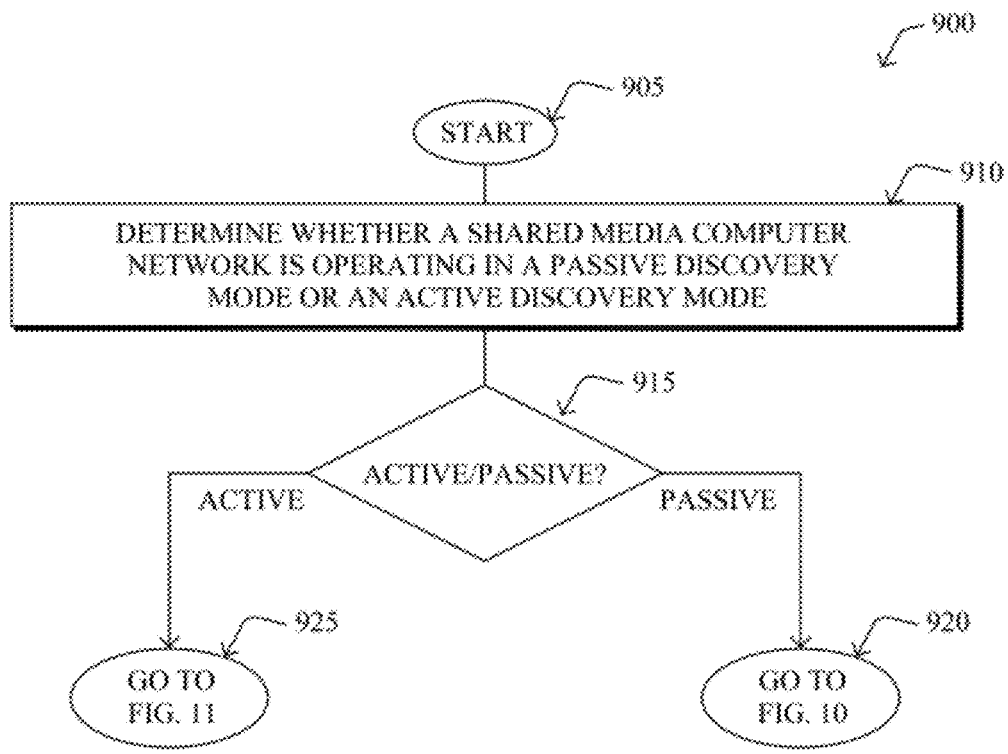
FIG. 9 illustrates an example simplified procedure for determining an appropriate mode of operation.

Note that in one or more particular embodiments herein, a device or application may be configured to operate according to both the active mode and passive mode described above. In this case, it is important to determine which mode is operated in for a shared media computer network (or at least the operating device if both modes may be simultaneously supported). For instance, FIG. 9 illustrates an example simplified procedure for determining an appropriate mode of operation in accordance with one or more embodiments described herein. The procedure 900 starts at step 905, and continues to step 910, where a particular node determines whether a shared media computer network is operating in a passive discovery mode or an active discovery mode. If the decision in step 915 is for passive discovery, then the procedure 900 operates according to the procedure 1000 in FIG. 10 (step 920), described below. Conversely, if active discovery is used, then the procedure 900 continues to procedure 1100 of FIG. 11 (step 925), below.

Figure 10:
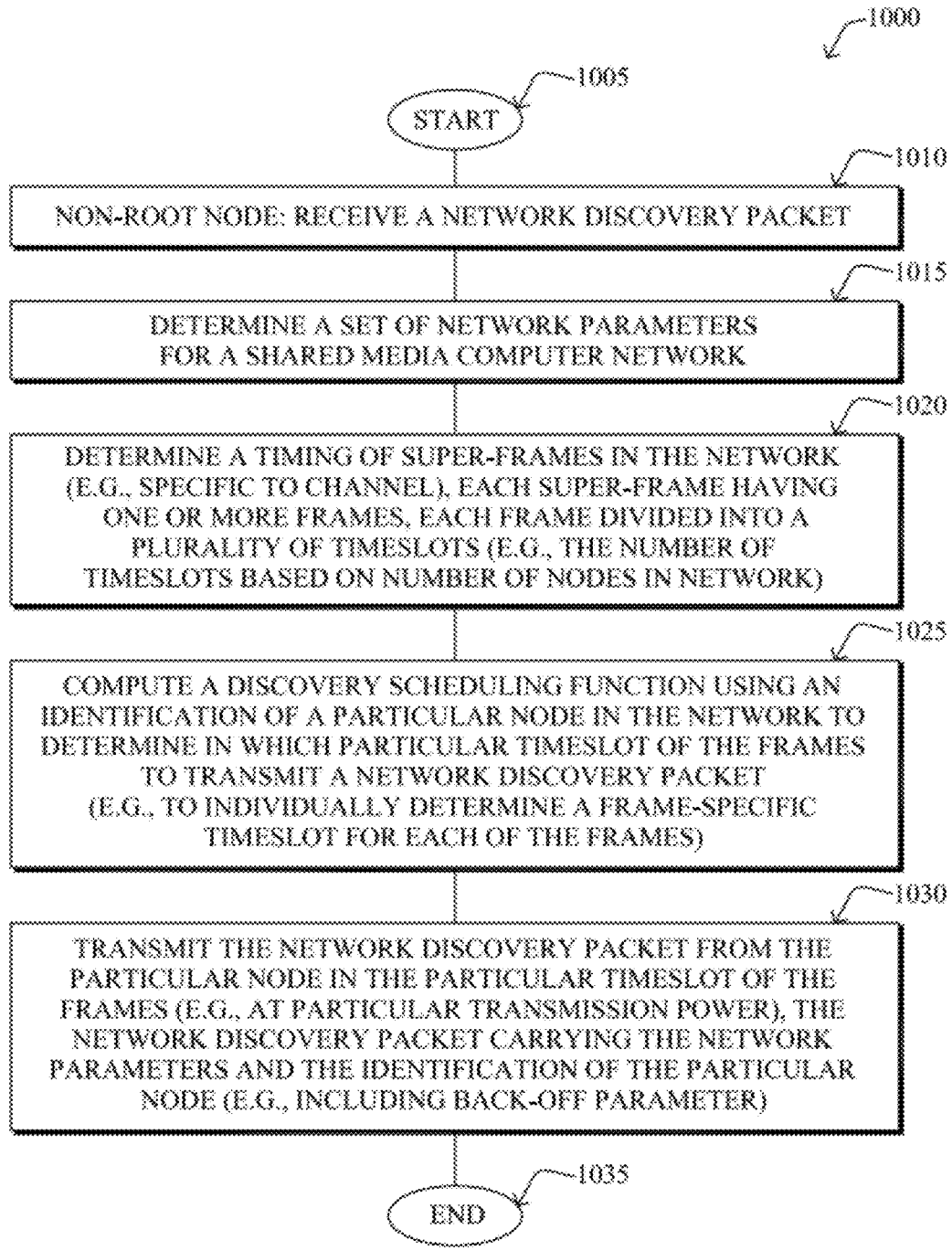
FIG. 10 illustrates an example simplified procedure for providing systematic network/neighbor detection (discovery) in a shared media computer network, specifically according to operating in the passive discovery mode.

In particular, FIG. 10 illustrates an example simplified procedure for providing systematic network/neighbor detection (discovery) in a shared media computer network in accordance with one or more embodiments described herein, specifically according to operating in the passive discovery mode. The procedure 1000 starts at step 1005, and continues to step 1010, where, as described in detail above, non-root-nodes initiate their respective process by receiving a network discovery packet 140, which may contain the network parameters determined in step 1015 for the shared media computer network 100. Note that root nodes, however, may obtain this information from a network administrator, a network management node, or other techniques, e.g., discussed above.

Generally from the network parameters, in step 1020 the particular nodes (root or non-root) determine a timing of super-frames 300 in the network, each super-frame having one or more frames 310, each frame divided into a plurality of timeslots 315. As noted above, the super-frames 300 may be specific to a channel, and also the number of timeslots may be based on a number of nodes in the network (e.g., all nodes or only those nodes operating on a corresponding specific channel).

In step 1025, the particular node compute a discovery scheduling function (Hk) using its identification (e.g., MAC address) to determine in which particular timeslot of the frames to transmit a network discovery packet. As described in greater detail above, such a determination may result in the same timeslot for each frame, or in individually determined frame-specific timeslots for each of the frames.

When the particular timeslot is reached in the super-frame, in step 1030 the particular node transmits the network discovery packet (e.g., at a particular transmission power as mentioned above) into the network 100. Note that the network discovery packet may carry the network parameters, and also the identification of the particular node. Note further that the network discovery packet may also include a configured back-off parameter, as also described herein. The procedure 1000 ends in step 1035, notably with the option of receiving additional network discovery packets, transmitting additional network discovery packets on a computed period schedule, etc.

Figure 11:
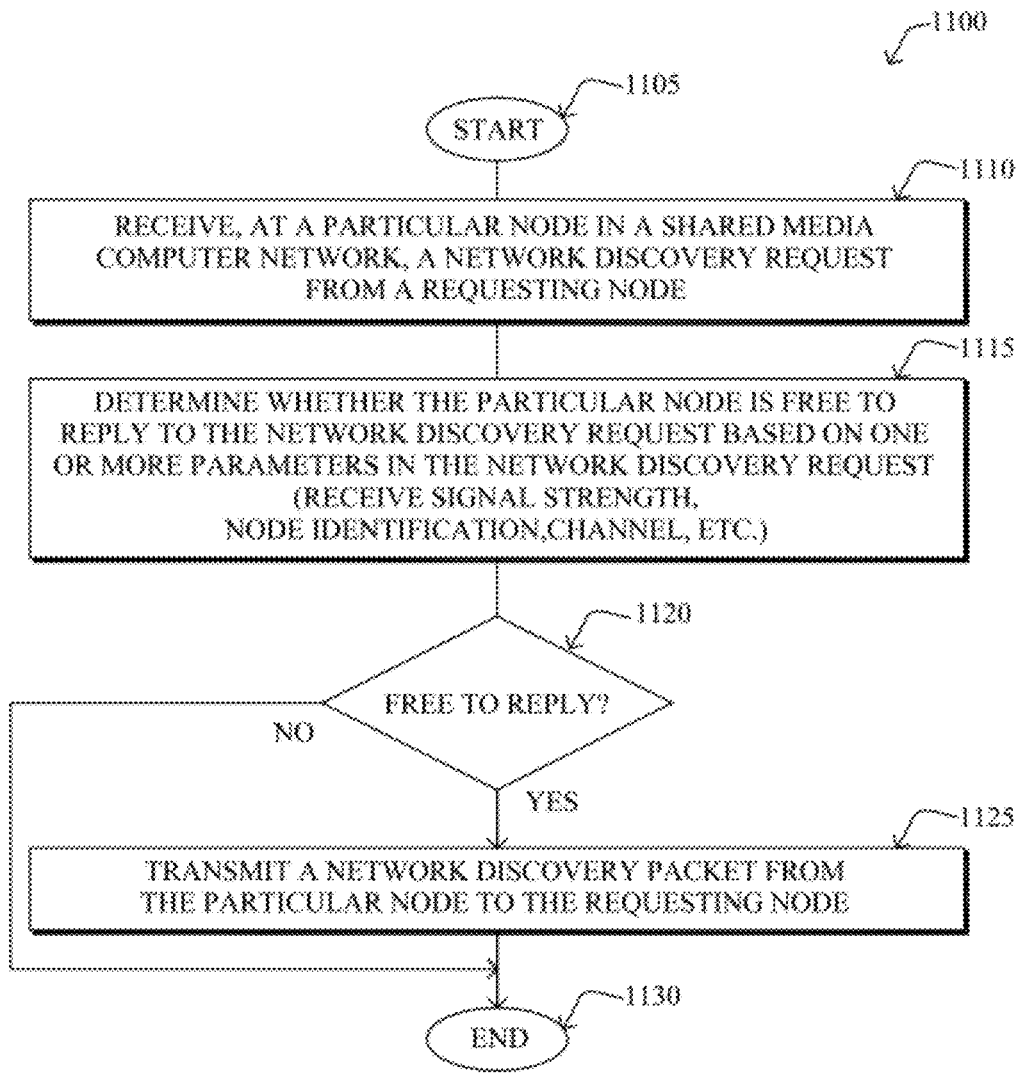
FIG. 11 illustrates an example simplified procedure for providing systematic network/neighbor detection (discovery) in a shared media computer network, specifically according to operating in the active discovery mode.

Additionally, FIG. 11 illustrates an example simplified procedure for providing systematic network/neighbor detection (discovery) in a shared media computer network in accordance with one or more embodiments described herein, specifically according to operating in the active discovery mode. The procedure 1100 starts at step 1105, and continues to step 1110, where, as described in detail above, a particular node receives a network discovery request from a requesting node. In response, in step 1115, the particular node may determine whether it is free to reply to the network discovery request based on one or more parameters in the network discovery request. For instance, as described in greater detail, the parameters may be based on a receive signal strength, node identification, channel, etc., such that certain nodes are included or excluded from transmitting any reply. Accordingly, if in step 1120 the particular node is free to reply to the request, then in step 1125 the particular node transmits the network discovery packet to the requesting node, and active discovery ends in step 1130. Note that the "end" of procedure 1130 is merely illustrative, and further requests may be received and handled according to the reply-limiting parameters within those requests, as described herein.

It should be noted, generally, that FIGS. 9-11 are merely examples for illustration, and are not meant to be limiting to the scope of the embodiments herein. For instance, while certain steps within the procedures 900 through 1100 may be optional as described above, certain steps may be included or excluded as desired, and the steps may also be in a different order where suitable. Further, while a particular order of the steps is shown, this ordering is merely illustrative, and any suitable arrangement of the steps may be utilized without departing from the scope of the embodiments herein. Still further, while the procedures above generally illustrate the perspective of the transmitting nodes, those skilled in the art will appreciate that similar complimentary steps (e.g., "transmitting" instead of "receiving") may be performed by a passively scanning device and/or an actively requesting device, and that the views shown herein are merely a representative example, accordingly.

The novel techniques described herein, therefore, provide for systematic network/neighbor detection (discovery) in a shared media computer network. In particular, the techniques herein synchronize nodes to a network-wide schedule such that nodes can efficiently transmit and receive neighbor discovery packets/beacons. It also proposes a mechanism for managing dense scenarios when active probing is used.

For instance, the techniques herein reduce the time it would take a mesh network to converge by structuring the timing used during mesh buildup. Specifically, packet collisions during a mesh network buildup reduce the effective bandwidth and thus increase the time it takes for a network to converge. A system in accordance with one or more embodiments herein, however, accelerates the mesh buildup by reducing the number of packet collisions during the mesh buildup process.

Moreover, the addressing methodology (use of the identification or MAC address of the client) provides an efficient (accelerated), deterministic, and reliable framing structure to perform network discovery in a mesh. For example, although the size of a mesh may grow, one critical piece in avoiding collisions is the actual number of neighbors a given node may have since the neighbors are in the collision/contention domain of a given node. In other words, although the mesh network may scale to 5000 nodes, the maximum neighbors a given node may have may be considerably less. Note also that the number of timeslots can be reduced further at the price of using more frequency channels to broadcast neighbor discovery packets, as mentioned above.

While there have been shown and described illustrative embodiments that provide for systematic network/neighbor detection (discovery) in a shared media computer network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols (e.g., PLC).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a particular node, whether a shared media computer network is operating in a passive discovery mode or an active discovery mode;
   based on determining that the shared media computer network is operating in a passive discovery mode, executing a passive discovery mode at the particular node in a shared media computer network to initially form a neighbor relationship by:
   receiving, at a particular node, a set of network parameters for the shared media computer network;
   determining, by the particular node, a timing of super-frames in the network, each super-frame having one or more frames, each frame divided into a plurality of timeslots;
   computing, by the particular node, a discovery scheduling function to determine which particular timeslot of the one or more frames a network discovery packet is to be transmitted from the particular node, wherein the particular timeslot is determined based on a media access control (MAC) address of the particular node in the network being input to the discovery scheduling function;
   transmitting, by the particular node, the network discovery packet from the particular node during the particular timeslot of the frames determined by the discovery scheduling function, the network discovery packet carrying the network parameters and the MAC address of the particular node;
   receiving a network discovery packet at the particular node from a second node in the network; and
   transmitting the network discovery packet from the particular node at a transmission power based on an indication in the received network discovery packet.

2. The method as in claim 1, wherein the discovery scheduling function is computed to individually determine a frame-specific timeslot for each of the frames.

3. The method as in claim 1, wherein the network discovery packet is transmitted on a particular channel, and wherein the super-frame is specific to the particular channel.

4. The method as in claim 1, wherein a number of the plurality of timeslots is adjusted based on a number of nodes in the network.

5. The method as in claim 4, wherein the network discovery packet is transmitted on a particular channel, and wherein the number of the plurality of timeslots is adjusted based on the number of nodes in the network operating on the particular channel.

6. The method as in claim 1, wherein determining the timing of super-frames is based on the network parameters.

7. The method as in claim 1, further comprising:
   receiving the network parameters at the particular node in a received network discovery packet from a second node in the network.

8. The method as in claim 7, wherein the second node is a root node of a directed acyclic graph (DAG).

9. The method as in claim 7, further comprising:
   synchronizing super-frame timing based on the received network discovery packet.

10. The method as in claim 1, wherein the particular node is a root node of a directed acyclic graph (DAG).

11. The method as in claim 10, wherein the particular timeslot is a synchronization timeslot specific to the root node.

12. The method as in claim 11, wherein there is only a single synchronization timeslot in the super-frame.

13. The method as in claim 1, further comprising:
   including in the transmitted network discovery packet a channel access back-off parameter based on a received power of the transmitted network discovery packet at one or more receiving nodes, the channel access back-off parameter to bias channel access toward receiving nodes with higher received power than a received power of other receiving nodes.

14. A method, comprising:
   executing an active discovery mode at a particular node in a shared media computer network to initially form a neighbor relationship with a requesting node:
   receiving, at a particular node in a shared media computer network, a network discovery request from the requesting node, wherein the network discovery request includes one or more parameters that specifically limits freedom to reply to the requesting node;
   based on the one or more parameters, determining whether the particular node is free to reply to the network discovery request based on at least on a received power range included in the network discovery request and a received signal strength of the network discovery request, wherein the particular node is free to reply to the network discovery request when the received signal strength is within the received power range;
   in response to being free to reply to the network discovery request, transmitting a network discovery packet from the particular node to the requesting node; and
   in response to being determining that the particular node is not free to reply to the network discovery request, excluding transmission of the network discovery packet to the requesting node.

15. The method as in claim 14, wherein the particular node is not free to reply to those certain nodes having a media access control (MAC) address that when input into a particular hash function results in deterministic differentiation from other nodes in the network.

16. The method as in claim 14, wherein the particular node is not free to reply to those certain nodes operating on a particular channel.

17. The method as in claim 14, wherein a particular parameter of the one or more parameters limits freedom to reply to those certain nodes receiving the network discovery request at a receive signal strength greater than a configured threshold.

18. A method, comprising:
   determining, by a particular node, whether a shared media computer network is operating in a passive discovery mode or an active discovery mode;
   based on determining that the shared media computer network is operating in a passive discovery mode:
   determining a set of network parameters for the shared media computer network;

determining a timing of super-frames in the network, each super-frame having one or more frames, each frame divided into a plurality of timeslots;

computing a discovery scheduling function to determine during which particular timeslot of the one or more frames a network discovery packet is to be transmitted from the particular node, wherein the particular timeslot is determined based on an identification of the particular node in the network being input to the discovery scheduling function; and transmitting the network discovery packet from the particular node in the particular timeslot of the frames determined by the discovery scheduling function, the network discovery packet carrying the network parameters and the identification of the particular node; and based on determining that the shared media computer network is operating in an active discovery mode:

receiving, at the particular node, a network discovery request from a requesting node;

determining whether the particular node is free to reply to the network discovery request based on at least on a received power range included in the network discovery request and a received signal strength of the network discovery request, wherein the particular node is free to reply to the network discovery request when the received signal strength is within the received power range; and in response to being free to reply to the network discovery request, transmitting the network discovery packet from the particular node to the requesting node.

19. An apparatus, comprising:

one or more network interfaces to communicate in a shared media computer network;

a processor coupled to the network interfaces and adapted to execute one or more processes; and a memory configured to store a process executable by the processor, the process when executed operable to:

execute a passive discovery mode to initially form a neighbor relationship by:

determining whether a shared media computer network is operating in a passive discovery mode or an active discovery mode;

based on determining that the shared media computer network is operating in a passive discovery mode:

receiving a set of network parameters for the shared media computer network;

determining a timing of super-frames in the network, each super-frame having one or more frames, each frame divided into a plurality of timeslots;

computing a discovery scheduling function to determine during which particular timeslot of the one or more frames a network discovery packet is to be transmitted from the particular node, wherein the particular timeslot is determined based on a media access control (MAC) address of the particular node in the network being input to the discovery scheduling function;

transmitting the network discovery packet in the particular timeslot of the frames, the network discovery packet carrying the network parameters and the MAC address of the apparatus;

receiving a network discovery packet from a second node in the network; and transmitting the network discovery packet at a transmission power based on an indication in the received network discovery packet.

20. An apparatus, comprising:

one or more network interfaces to communicate in a shared media computer network;

a processor coupled to the network interfaces and adapted to execute one or more processes; and a memory configured to store a process executable by the processor, the process when executed operable to:

execute an active mode to initially form a neighbor relationship with a requesting node by:

receiving a network discovery request from a requesting node, wherein the network discovery request includes one or more parameters that specifically limits freedom to reply to the requesting node;

based on the one or more parameters, determining whether the apparatus is free to reply to the network discovery request;

in response to being free to reply to the network discovery request, transmit a network discovery packet to the requesting node; and in response to being determining that the particular node is not free to reply to the network discovery request, excluding transmission of the network discovery packet to the requesting node.

21. The apparatus as in claim 20, wherein the particular node is not free to reply to those certain nodes receiving the network discovery request at a receive signal strength greater than a configured threshold; those certain nodes having a media access control (MAC) address of the particular node that when input into a particular hash function results in deterministic differentiation from other nodes in the network; or those certain nodes operating on a particular channel.

* * * * *